(12) United States Patent
Walker et al.

(10) Patent No.: US 8,614,542 B2
(45) Date of Patent: Dec. 24, 2013

(54) ALUMINA CERAMIC FOR SPARK PLUG INSULATOR

(75) Inventors: William J. Walker, Toledo, OH (US); Michael E. Saccoccia, Toledo, OH (US)

(73) Assignee: Federal-Mogul Ignition Company, Southfield, MI (US)

( * ) Notice: Subject to any disclaimer, the term of this patent is extended or adjusted under 35 U.S.C. 154(b) by 551 days.

(21) Appl. No.: 12/869,259

(22) Filed: Aug. 26, 2010

(65) Prior Publication Data

US 2011/0077141 A1    Mar. 31, 2011

Related U.S. Application Data

(63) Continuation-in-part of application No. 11/611,946, filed on Dec. 18, 2006, now Pat. No. 7,799,717.

(60) Provisional application No. 61/327,201, filed on Apr. 23, 2010.

(51) Int. Cl.
*H01T 13/39* (2006.01)

(52) U.S. Cl.
USPC .............................. 313/143; 313/130; 313/18

(58) Field of Classification Search
USPC .................................. 313/118, 130, 141–143
See application file for complete search history.

(56) References Cited

U.S. PATENT DOCUMENTS

| 3,502,595 A | 3/1970 | Johnson |
| 3,615,763 A | 10/1971 | Flock |
| 3,929,496 A | 12/1975 | Asano |
| 4,552,852 A | 11/1985 | Manning |
| 4,601,991 A | 7/1986 | Ando et al. |
| 4,751,207 A | 6/1988 | Manning |
| 4,760,038 A | 7/1988 | Kinney, Jr. |
| 4,879,260 A | 11/1989 | Manning |
| RE34,028 E | 8/1992 | Manning |
| 5,147,833 A | 9/1992 | Manning |
| 5,273,474 A | 12/1993 | Oshima |
| 6,166,481 A | 12/2000 | Knapp |
| 6,239,052 B1 | 5/2001 | Fukushima |
| 6,559,579 B2 | 5/2003 | Itoh |

(Continued)

FOREIGN PATENT DOCUMENTS

| DE | 4215939 A1 | 11/1993 |
| EP | 0850897 A1 | 7/1998 |

(Continued)

*Primary Examiner* — Anh Mai
*Assistant Examiner* — Brenitra M Lee
(74) *Attorney, Agent, or Firm* — Robert L. Stearns; Dickinson Wright, PLLC

(57) ABSTRACT

A spark plug includes an insulator formed of a ceramic material. The ceramic material comprises $Al_2O_3$ in an amount of 98.00 wt % to 99.50 wt %; Group 2 oxides in an amount of 0.16 wt % to 0.70 wt %; $SiO_2$ in an amount of 0.25 wt % to 0.75 wt %, Group 4 oxides in an amount of 0.01 wt % to 0.16 wt %, Group 1 oxides in an amount less than 0.0060 wt %, and $P_2O_5$ in an amount of less than 0.0040 wt %. The $Al_2O_3$ is formed of particles having a D50 median particle size by volume of 1.2 μm to 1.8 μm. The ceramic material is pressed, sintered, and formed to a predetermined shape. The sintered ceramic material includes a glass phase comprising the $Al_2O_3$, Group 2 oxides, and $SiO_2$. The sintered ceramic material also includes secondary crystals of calcium hexa-aluminate ($CaAl_{12}O_{19}$) spinel ($MgAl_2O_4$), anorthite ($CaAl_2Si_2O_8$), and mullite ($Al_6Si_2O_{13}$).

22 Claims, 3 Drawing Sheets

(56) References Cited

U.S. PATENT DOCUMENTS

| | | |
|---|---|---|
| 7,169,723 B2 | 1/2007 | Walker |
| 2001/0004184 A1* | 6/2001 | Ito et al. .................. 313/143 |
| 2002/0033659 A1 | 3/2002 | Nishikawa |
| 2003/0127959 A1* | 7/2003 | Nishikawa et al. ......... 313/143 |
| 2005/0110382 A1* | 5/2005 | Walker, Jr. ................. 313/143 |
| 2008/0143229 A1 | 6/2008 | Walker |

FOREIGN PATENT DOCUMENTS

| | | |
|---|---|---|
| EP | 0954074 A2 | 11/1999 |
| JP | 53 126008 A | 11/1978 |
| JP | 1 143368 A | 6/1989 |
| WO | 2005049523 | 6/2005 |
| WO | 2008079532 | 7/2008 |

* cited by examiner

ALUMINA CERAMIC FOR SPARK PLUG INSULATOR

RELATED APPLICATIONS

This application is a continuation in part application which claims priority to U.S. application Ser. No. 11/611,946, filed Dec. 18, 2006 now U.S. Pat. No. 7,799,717, and U.S. Provisional Application Ser. No. 61/327,201, filed Apr. 23, 2010, all of which are incorporated herein by reference.

BACKGROUND OF THE INVENTION

1. Field of the Invention

This invention relates generally to ceramic materials, and more particularly to ceramic materials for insulators of spark plugs.

2. Description of the Prior Art

Spark plugs typically extend into the combustion chamber of an internal combustion engine and include a cylindrical metal shell having a firing end and a hook shaped ground electrode attached thereto. A cylindrical insulator is disposed partially within the metal shell and extends axially beyond the metal shell toward the firing end and also toward a terminal end. At the firing end, a cylindrical center electrode is disposed within the insulator and projects axially out of the insulator toward the ground electrode, wherein a spark gap is defined between the electrodes.

During operation, ignition voltage pulses are applied though the spark plug to the center electrode, thereby causing a spark to jump the spark gap between the center electrode and ground electrode. The spark ignites an air and fuel mixture within the combustion chamber to create high temperature combustion to power the engine. The ceramic insulator is used to isolate the high voltage at the electrodes, ensuring that the spark happens at the tip of the center electrode and not anywhere else on the spark plug. The insulator is subjected to harsh conditions at temperatures of up to about 1000° C., and therefore, is typically formed of a ceramic material to provide adequate thermal conductivity and dielectric strength.

However, as combustion engines become more complex, operating at high temperatures, and requiring higher voltages for the spark to jump the spark gap, the performance demands for ceramic insulators increase. In addition, manufacturers desire to increase the service lifetimes of spark plug insulators while keeping the size and cost of the spark plug insulator to a minimum.

SUMMARY OF THE INVENTION

One aspect of the invention provides a ceramic material for an insulator of a spark plug comprising, in weight percent (wt %) of the ceramic material, aluminum oxide ($Al_2O_3$) in an amount of 98.00 wt % to 99.50 wt %; at least one oxide of a Group 2 alkaline earth metal (Group 2 oxide) in an amount of 0.16 wt % to 0.70 wt %; and silicon dioxide ($SiO_2$) in an amount of 0.25 wt % to 0.75 wt %. The $Al_2O_3$ powder used to prepare the ceramic has a D50 median particle size by volume of 1.2 µm to 1.8 µm.

The wt % of a component of the ceramic material is defined as the concentration of the component relative to the total amount of the ceramic material. The presence and amount of the $Al_2O_3$, Group 2 oxides, and $SiO_2$, are measured by x-ray fluorescence (XRF) or Inductively Coupled Plasma (ICP) after sintering the ceramic material. A particle size distribution of the $Al_2O_3$ is measured using a Beckman-Coulter LS-230 laser scattering instrument before pressing and sintering the ceramic material. The median particle size is determined from the particle size distribution. The D50 median particle size by volume is the equivalent spherical diameter of the particle where 50.0% of the particles have a larger equivalent diameter, and the other 50.0% have a smaller equivalent diameter.

Another aspect of the invention provides an insulator formed of a ceramic material for a spark plug comprising, in wt % of the ceramic material, $Al_2O_3$ in an amount of 98.00 wt % to 99.50 wt %; at least one Group 2 oxide in an amount of 0.16 wt % to 0.70 wt %; and $SiO_2$ in an amount of 0.25 wt % to 0.75 wt %. The $Al_2O_3$ has a D50 median particle size by volume of 1.2 µm to 1.8 µm.

Another aspect of the invention provides a spark plug including an insulator formed of a ceramic material comprising, in wt % of the ceramic material, $Al_2O_3$ in an amount of 98.00 wt % to 99.50 wt %; at least one Group 2 oxide in an amount of 0.16 wt % to 0.70 wt %; and $SiO_2$ in an amount of 0.25 wt % to 0.75 wt The $Al_2O_3$ has a D50 median particle size by volume of 1.2 µm to 1.8 µm.

Yet another aspect of the invention provides a method of fabricating a ceramic material for an insulator of a spark plug comprising the steps of providing ceramic particles comprising, in wt % of the ceramic material, $Al_2O_3$ having a D50 median particle size by volume of 1.2 µm to 1.8 µm in amount of 98.00 wt % to 99.50 wt %, at least one Group 2 oxide in an amount of 0.16 wt % to 0.70 wt %, and $SiO_2$ in an amount of 0.25 wt % to 0.75 wt %; pressing the ceramic particles; and sintering the ceramic particles.

Another aspect of the invention provides a method of fabricating an insulator formed of a ceramic material for a spark plug comprising the steps of providing ceramic particles comprising, in wt % of the ceramic material, $Al_2O_3$ having a D50 median particle size by volume of 1.2 µm to 1.8 µm in amount of 98.00 wt % to 99.50 wt %, at least one Group 2 oxide in an amount of 0.16 wt % to 0.70 wt %, and $SiO_2$ in an amount of 0.25 wt % to 0.75 wt %; pressing the ceramic particles; sintering the ceramic particles; and forming the ceramic particles to a predetermined shape.

The ceramic material for the spark plug insulator provides an improved thermal conductivity and dielectric strength compared to prior art ceramic insulators. Therefore, the ceramic material provides longer service life and improved performance within the high temperature, high voltage environment of the combustion chamber, without a significant increase in size or cost of the ceramic insulator.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
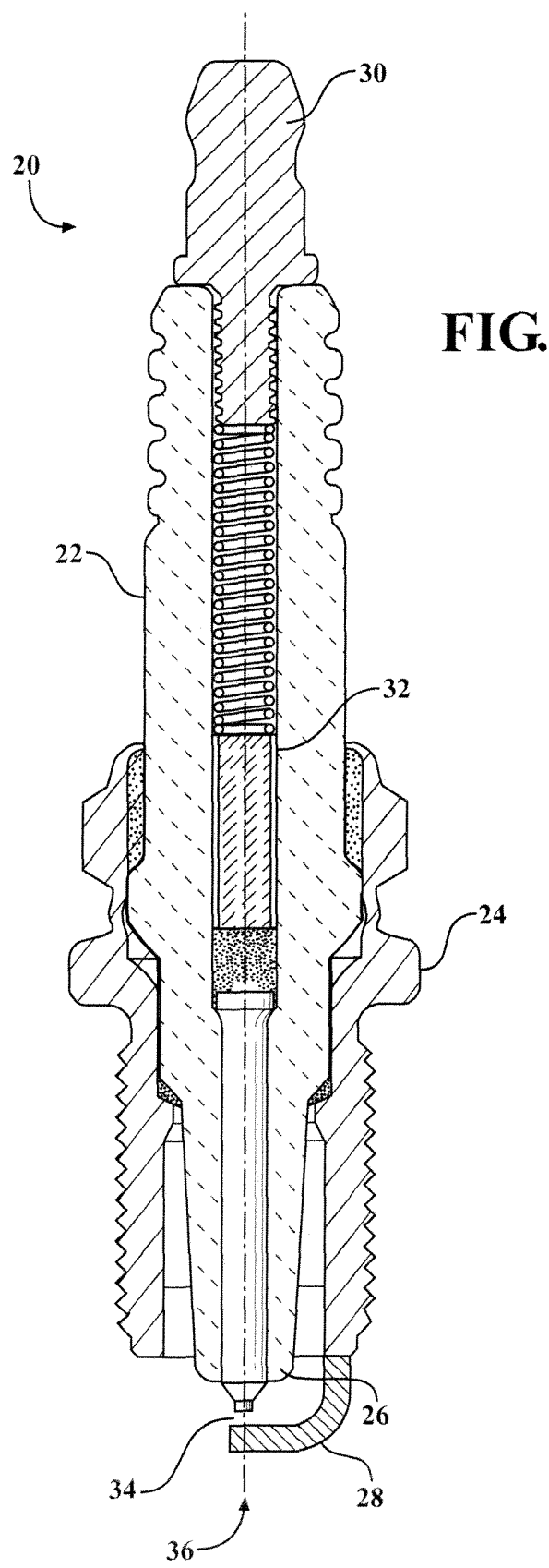
FIG. 1 is a partial fragmentary view of a spark plug having a ceramic insulator in accordance with the subject invention.

Referring to FIG. 1, a representative spark plug 20 for igniting a mixture of fuel and air in an internal combustion engine is shown. The spark plug 20 includes an insulator 22 formed of a ceramic material comprising, in weight percent (wt %) of the ceramic material, aluminum oxide ($Al_2O_3$) in an amount of 98.00 wt % to 99.50 wt %; at least one oxide of a Group 2 alkali earth metal (Group 2 oxide) in an amount of 0.16 wt % to 0.70 wt %; and silicon dioxide ($SiO_2$) in an amount of 0.25 wt % to 0.75 wt %. The $Al_2O_3$ has a median particle size (D50) by volume of 1.2 microns (μm) to 1.8 μm. The ceramic material is fabricated by providing ceramic particles including $Al_2O_3$, at least one Group 2 oxide, and $SiO_2$; pressing the ceramic particles; and sintering the ceramic particles.

The wt % of a component of the ceramic material is defined as the concentration of the component relative to the total amount of the ceramic material. For example, if the ceramic material includes $Al_2O_3$ in an amount of 99.00 wt %, then 99.00% of the total ceramic material consists of $Al_2O_3$, and the remaining 1.00% of the total ceramic material consists of other compounds. The presence and amount of the $Al_2O_3$, Group 2 oxides, and $SiO_2$ of the ceramic material are measured by x-ray fluorescence (XRF) or Inductively Coupled Plasma (ICP) after sintering the ceramic material. A particle size distribution of the $Al_2O_3$ is measured using a Beckman-Coulter LS-230 laser scattering instrument before pressing and sintering the ceramic material. The median particle size is determined from the particle size distribution.

The representative spark plug 20 assembly includes a metal shell 24, an insulator 22, a center electrode 26, and a ground electrode 28, as shown in FIG. 1. As commonly known in the art, the metal shell 24 is a generally cylindrical, electrically conductive component having a hollow bore extending along its axial length. Within that bore are a series of circumferential shoulders sized to support diametrically reduced sections of the insulator 22. Like the metal shell 24, the insulator 22 also has a generally cylindrical shape and includes an elongated axial bore. The lower axial end of the insulator 22 comprises a nose portion which generally extends out of and beyond the lowermost portion of the metal shell 24 and toward a firing end 36. The axial bore of the insulator 22 is designed to receive a terminal electrode 30 at one end and the center electrode 26 at the firing end 36. A center wire assembly 32 extends from the terminal electrode 30 to the center electrode 26. The ground electrode 28 is both mechanically and electrically connected to the lower axial end of the metal shell 24. The exposed end of the center electrode 26 and a side surface of the ground electrode 28 oppose each other and thereby define a spark gap 34 at the firing end 36 of the spark plug 20. The spark plug 20 shown in FIG. 1 and described herein is only one example embodiment among many possible embodiments.

In operation, the terminal electrode 30 receives a high voltage ignition pulse from an ignition system (not shown) which travels along the center wire assembly 32 until it reaches the lower exposed end of the center electrode 26. If the pulse has sufficient energy to bridge the spark gap 34, a spark is formed between the center electrode 26 and the ground electrode 28, which in turn is grounded to the engine via the metal shell 24. The spark ignites a fuel/air mixture which has previously been injected into a combustion chamber within the engine, which in turn initiates the combustion process used to power the engine.

The insulator 22 of the spark plug 20 is formed of a ceramic material comprising $Al_3O_3$ in an amount sufficient to affect the thermal conductivity and dielectric strength of the ceramic material. The ceramic material includes, in wt % of the ceramic material, the $Al_2O_3$ in an amount of 98.00 wt % to 99.50 wt %. In another embodiment, the ceramic material includes the $Al_2O_3$ in an amount of 98.50 wt % to 99.30 wt %. In yet another embodiment, the ceramic material includes the $Al_2O_3$ in an amount of 98.90 wt % to 99.10 wt %. As stated above, the presence and amount of $Al_2O_3$ is measured by x-ray fluorescence (XRF) or Inductively Coupled Plasma (ICP) after sintering the ceramic material.

The $Al_2O_3$ is provided in the form of ceramic particles having a particle size sufficient to affect the porosity, density, and dielectric strength of the ceramic material. In one embodiment, the $Al_2O_3$ has a D50 median particle size by volume of 1.2 μm to 1.8 μm. In another embodiment, the $Al_2O_3$ has a D50 median particle size by volume of 1.3 μm to 1.7 μm. In yet another embodiment, the $Al_2O_3$ has a D50 median particle size by volume of 1.4 μm to 1.6 μm. The D50 median particle size is the equivalent spherical diameter of the particle where 50.0% of the particles have a larger equivalent diameter, and the other 50.0% have a smaller equivalent diameter. As stated above, the particle size distribution is measured using a Beckman-Coulter LS-230 laser scattering instrument before pressing and sintering the ceramic particles, and the median particle size is determined from the particle size distribution.

The particle size distribution can also be described as a D90 particle size. In one embodiment, the $Al_2O_3$ has a D90 particle size by volume of 2.5 μm to 6.0 μm. In another embodiment, the $Al_2O_3$ has a D90 particle size by volume of 2.9 μm to 5.1 μm. In yet another embodiment, the $Al_2O_3$ has a D90 particle size by volume of 3.5 μm to 4.5 μm. The D90 particle size by volume is the equivalent spherical diameter of the particle where 90.0% of the particles have a particle size smaller than the D90 equivalent diameter. This particle size distribution measurement is also conducted using a Beckman-Coulter LS-230 laser scattering instrument before pressing and sintering the ceramic particles, and the D90 particle size is determined from the particle size distribution.

The ceramic $Al_2O_3$ particles have a specific surface area sufficient to affect the porosity, density, and dielectric strength of the ceramic material. In one embodiment, the $Al_2O_3$ has a specific surface area of 2.0 $m^2/g$ to 5.0 $m^2/g$. In another embodiment, the $Al_2O_3$ has a specific surface area of 2.5 $m^2/g$ to 4.5 $m^2/g$. In yet another embodiment, the $Al_2O_3$ has a specific surface area of 3.0 $m^2/g$ to 4.0 $m^2/g$. The specific surface area of the $Al_2O_3$ particles is measured by the BET method using a Micromeritics Instrument Corporation Gemini II Model 2370. The BET method involves determining the specific surface area by measuring the amount of nitrogen gas that is absorbed on the surface of the ceramic particles in order to form a single layer of molecules. The specific surface area of the $Al_2O_3$ is measured before pressing and sintering the ceramic particles.

The ceramic insulator includes at least one Group 2 oxide in an amount sufficient to affect the thermal conductivity and dielectric strength of the ceramic material. The ceramic material includes, in wt % of the ceramic material, the at least one Group 2 oxide in an amount of 0.16 wt % to 0.70 wt %. In one embodiment, the ceramic material includes the at least one Group 2 oxide in an amount of 0.33 wt % to 0.60 wt %. In yet another embodiment, the ceramic material includes the at least one Group 2 oxide in an amount of 0.40 wt % to 0.53 wt %. The wt % of the at least one Group 2 oxide is equal to the sum of the wt % of each Group 2 oxide of the ceramic material relative to the total amount of the ceramic material. In other words, the wt % of the at least one Group 2 oxide is defined as the concentration of the Group 2 oxides relative to the total amount of the ceramic material. The presence and amount of the Group 2 oxides are measured by x-ray fluorescence (XRF) or Inductively Coupled Plasma (ICP) after sintering the ceramic material.

The Group 2 oxides of the ceramic material include at least one of the group comprising calcium oxide (CaO), magnesium oxide (MgO), beryllium oxide (BeO), strontium oxide (SrO), barium oxide (BaO), and radium oxide (RaO). In one embodiment, the Group 2 oxides of the ceramic material include calcium oxide (CaO) and magnesium oxide (MgO) in an amount of 0.16 wt % to 0.70 wt %.

In one embodiment, the ceramic material includes, in wt % of the ceramic material, the CaO in an amount of 0.15 wt % to 0.55 wt %. In another embodiment, the ceramic material includes the CaO in an amount of 0.30 wt % to 0.50 wt %. In yet another embodiment, the ceramic material includes the CaO in an amount of 0.35 wt % to 0.45 wt %. The presence and amount of CaO is measured by x-ray fluorescence (XRF) or Inductively Coupled Plasma (ICP) after sintering the ceramic material.

In one embodiment, the ceramic material includes, in wt % of the ceramic material, the MgO in an amount of 0.01 wt % to 0.15 wt %. In another embodiment, the ceramic material includes the MgO in an amount of 0.03 wt % to 0.10 wt %. In yet another embodiment, the ceramic material includes the MgO in an amount of 0.05 wt % to 0.08 wt %. The presence and amount of MgO is measured by x-ray fluorescence (XRF) or Inductively Coupled Plasma (ICP) after sintering the ceramic material.

The ceramic material includes silicon dioxide ($SiO_2$) in an amount sufficient to affect the thermal conductivity and dielectric strength of the ceramic material. The ceramic material includes, in wt % of the ceramic material, the $SiO_2$ in an amount of 0.25 wt % to 0.75 wt %. In one embodiment, the ceramic material includes the $SiO_2$ in an amount of 0.50 wt % to 0.70 wt %. In yet another embodiment, the ceramic material includes the $SiO_2$ in an amount of 0.55 wt % to 0.65 wt %. The presence and amount of $SiO_2$ is measured by x-ray fluorescence (XRF) or Inductively Coupled Plasma (ICP) after sintering the ceramic material.

In one embodiment, the ceramic material includes at least one oxide of a Group 4 transition metal (Group 4 oxide) in an amount sufficient to affect the thermal conductivity and dielectric strength of the ceramic material. In one embodiment, the ceramic material includes, in wt % of the ceramic material, the at least one Group 4 oxide in amount of 0.01 wt % to 0.16 wt %. In another embodiment, the ceramic material includes the at least one Group 4 oxide in amount of 0.04 wt % to 0.13 wt %. In yet another embodiment, the ceramic material includes the at least one Group 4 oxide in amount of 0.07 wt % to 0.10 wt %. The presence and amount of the Group 4 oxides are measured by x-ray fluorescence (XRF) or Inductively Coupled Plasma (ICP) after sintering the ceramic material.

The Group 4 oxides of the ceramic material include at least one of zirconium oxide ($ZrO_2$), titanium dioxide ($TiO_2$), hafnium oxide ($HfO_2$), and rutherfordium oxide ($RfO_2$). In one embodiment, the Group 4 oxides include $ZrO_2$ and $TiO_2$ in an amount of 0.07 wt % to 0.10 wt %.

In one embodiment, the ceramic material includes, in wt % of the ceramic material, the $ZrO_2$ in an amount of 0.01 wt % to 0.15 wt %. In another embodiment, the ceramic material includes the $ZrO_2$ in an amount of 0.04 wt % to 0.12 wt %. In yet another embodiment, the ceramic material includes the $ZrO_2$ in an amount of 0.07 wt % to 0.09 wt %. The presence and amount of $ZrO_2$ is measured by x-ray fluorescence (XRF) or Inductively Coupled Plasma (ICP) after sintering the ceramic material.

In one embodiment, the ceramic material includes, in wt % of the ceramic material, the $TiO_2$ in an amount of up to 0.01 wt %. In another embodiment, the ceramic material includes the $TiO_2$ in an amount of up to 0.006 wt %. In yet another embodiment, the ceramic material includes the $TiO_2$ in an amount of up to 0.004 wt %. The presence and amount of $TiO_2$ is measured by x-ray fluorescence (XRF) or Inductively Coupled Plasma (ICP) after sintering the ceramic material.

In one embodiment, the ceramic material includes at least one oxide of a Group 1 alkali metal (Group 1 oxide) in an amount sufficient to affect the thermal conductivity and dielectric strength of the ceramic material. In one embodiment, the ceramic material includes, in wt % of the ceramic material, the at least one Group 1 oxide in an amount of less than 0.0060 wt %. In another embodiment, the ceramic material includes the at least one Group 1 oxide in an amount of less than 0.0040 wt %. In yet another embodiment, the ceramic material includes the at least one Group 1 oxide in an amount of less than 0.0020 wt %. The presence and amount of the Group 1 oxides are measured by x-ray fluorescence (XRF) or Inductively Coupled Plasma (ICP) after sintering the ceramic material.

The Group 1 oxides of the ceramic material include at least one of potassium oxide ($K_2O$), sodium oxide ($Na_2O$), lithium oxide ($Li_2O$), rubidium oxide ($Rb_2O$), cesium oxide ($Cs_2O$), and francium oxide ($Fr_2O$). In one embodiment, the Group 1 oxides of the ceramic material include $K_2O$ and $Na_2O$ in an amount of less than 0.0060 wt %.

In one embodiment, the ceramic material includes at least one Group 2 oxide, at least one Group 4 oxide, and at least one Group 1 oxide. In another embodiment, the ceramic material includes at least one Group 2 oxide and at least one Group 4 oxide. In yet another embodiment, the ceramic material includes at least one Group 2 oxide and at least one Group 1 oxide.

In one embodiment, the ceramic material includes, in wt % of the ceramic material, the $K_2O$ in an amount of less than 0.0050 wt %. In another embodiment, the ceramic material includes the $K_2O$ in an amount of less than 0.0030 wt %. In yet another embodiment, the ceramic material includes the $K_2O$ in an amount of less than 0.0020 wt %. The presence and amount of $K_2O$ is measured by x-ray fluorescence (XRF) or Inductively Coupled Plasma (ICP) after sintering the ceramic material.

In one embodiment, the ceramic material includes, in wt % of the ceramic material, the $Na_2O$ in an amount of up to 0.0010 wt %. In another embodiment, the ceramic material includes the $Na_2O$ in an amount up to 0.0009 wt %. In yet another embodiment, the ceramic material includes the $Na_2O$ in an amount up to 0.0007 wt %. The presence and amount of $Na_2O$ is measured by x-ray fluorescence (XRF) or Inductively Coupled Plasma (ICP) after sintering the ceramic material.

In one embodiment, the ceramic material includes phosphorous pentoxide ($P_2O_5$) in an amount sufficient to affect the thermal conductivity and dielectric strength of the ceramic material. In one embodiment, the ceramic material includes, in wt % of the ceramic material, the $P_2O_5$ in an amount of less than 0.0040 wt %. In another embodiment, the ceramic material includes the $P_2O_5$ in an amount of 0.0010 wt % to 0.0035 wt %. In yet another embodiment, the ceramic material includes the $P_2O_5$ in an amount of 0.0025 wt % to 0.0030 wt %. The presence and amount of the $P_2O_5$ is measured by x-ray fluorescence (XRF) or Inductively Coupled Plasma (ICP) after sintering the ceramic material.

In one embodiment, the ceramic material includes boron oxide ($B_2O_3$) in an amount sufficient to affect the thermal conductivity and dielectric strength of the ceramic material. In one embodiment, the ceramic material includes, in wt % of the ceramic material, the $B_2O_3$ in an amount up to 0.50 wt %. In another embodiment, the ceramic material includes the $B_2O_3$ in an amount up to 0.40 wt %. In yet another embodiment, the ceramic material includes the $B_2O_3$ in an amount up to 0.30 wt %. The presence and amount of the $B_2O_3$ is measured by Inductively Coupled Plasma (ICP) after sintering the ceramic material.

In one embodiment, the ceramic material is combined with a binder in an amount sufficient to adhere the components of the ceramic material to one another. The binder is not included in the composition of the ceramic material when determining wt % of each component. The binder preferably includes an organic resin or wax, such as polyvinyl alcohol (PVA), polyethylene glycol (PEG), wax, or an emulsion including wax, water, and emulsifying agents, or a mixture of these organic resins and waxes. The binder is added in an amount of about 1.5 wt % to about 2.5 wt %, based on the dry weight of the ceramic powder. Typically, the binder burns off cleanly during the sintering step and is not present in the sintered ceramic material.

In one embodiment, at least a portion of the $Al_2O_3$, Group 2 oxides, and $SiO_2$ combine during sintering to form a glass phase. The sintered ceramic material includes, in wt % of the ceramic material, the glass phase in an amount of 0.50 wt % to 2.0 wt %. In another embodiment, the sintered ceramic includes the glass phase in an amount of 0.75 wt % to 1.5 wt %. In yet another embodiment, the sintered ceramic includes the glass phase in an amount of 0.85 wt % to 1.15 wt %. Comparable prior art ceramic materials typically include a glass phase in an amount of 4.0 wt % to 5.0 wt %. The presence of the glass phase in the sintered ceramic material is measured using x-ray diffraction (XRD) or by electron diffraction using an analytical screening transmission electron microscope (ASTEM) after sintering the ceramic material. The amount of glass phase can be estimated using x-ray fluorescence (XRF) or Inductively Coupled Plasma (ICP) after sintering the ceramic material.

In one embodiment, the glass phase includes, in wt % of the glass phase, the $Al_2O_3$ in an amount of 5.0 wt % to 50.0 wt %. In another embodiment, the glass phase includes the $Al_2O_3$ in an amount of 15.0 wt % to 45.0 wt %. In yet another embodiment, the glass phase includes the $Al_2O_3$ in an amount of 31.0 wt % to 39.0 wt %. The presence of the $Al_2O_3$ in the glass phase is measured using energy dispersive spectroscopy EDS or EDX using a analytical scanning transmission electron microscope (ASTEM) after sintering the ceramic material. The amount of $Al_2O_3$ in the glass phase is difficult to determine analytically, but an $Al_2O_3$—$SiO_2$—MgO—CaO phase diagram indicates the $Al_2O_3$ is typically present in an amount of 15.0 wt % to 45.0 wt %.

In one embodiment, the glass phase includes, in wt % of the glass phase, the Group 2 oxides in an amount of 15.5 wt % to 31.7 wt %. In another embodiment, the glass phase includes the Group 2 oxides in an amount of 17.0 wt % to 27.5 wt %. In yet another embodiment, the glass phase includes the Group 2 oxides in an amount of 21.2 wt % to 25.0 wt %. The presence of the Group 2 oxides in the glass phase is measured using energy dispersive spectroscopy EDS or EDX using a analytical scanning transmission electron microscope (ASTEM) after sintering the ceramic material.

In one embodiment, the Group 2 oxides of the glass phase include CaO in an amount of 15.0 wt % to 24.0 wt % and MgO in an amount of 0.5 wt % to 7.7 wt %. In another embodiment, the Group 2 oxides include CaO in an amount of 17.0 wt % to 22.4 wt % and MgO in an amount of 0.9 wt % to 5.5 wt %. In another embodiment, the Group 2 oxides include CaO in an amount 19.0 wt % to 20.0 wt % and MgO in an amount of 2.5 wt % to 4.6 wt %.

In one embodiment, the glass phase includes, in wt % of the glass phase, the $SiO_2$ in an amount of 27.0 wt % to 50.0 wt %. In another embodiment, the glass phase includes the $SiO_2$ in an amount of 34.0 wt % to 47.3 wt %. In yet another embodiment, the glass phase includes the $SiO_2$ in an amount of 40.0 wt % to 43.2 wt %. The presence of the $SiO_2$ in the glass phase using energy dispersive spectroscopy EDS or EDX using a analytical scanning transmission electron microscope (ASTEM) after sintering the ceramic material.

In one embodiment, at least a portion of the $Al_2O_3$, Group 2 oxides, and $SiO_2$ combine during sintering to form secondary crystals. The secondary crystals include at least one of calcium hexa-aluminate ($CaAl_{12}O_{19}$) spinel ($MgAl_2O_4$), anorthite ($CaAl_2Si_2O_8$), and mullite ($Al_6Si_2O_{13}$). The presence and amount of the secondary crystals are measured by a Scanning Electron Microscope (SEM) with energy-dispersive X-ray spectroscopy (EDS). The phase composition of the secondary crystals is measured using X-ray diffraction (XRD) or by electron diffraction using an analytical scanning transmission electron microscope (ASTEM). The sintered ceramic material typically includes the secondary crystals in an amount of less than 1.0%. The presence of the $Al_2O_3$, Group 2 oxides, and $SiO_2$ in each of the secondary crystals is also measured by a Scanning Electron Microscope (SEM) with energy-dispersive X-ray spectroscopy (EDS). The amount of the Al, O, Si and Group 2 elements in the secondary crystals is difficult to determine analytically due to the low amount of secondary crystals in the sintered ceramic material.

Table 1 includes Inventive Example 1 which is one of the many embodiments of the inventive ceramic material. Table 1 also includes Comparative Example 1, which is a prior art ceramic material.

TABLE 1

|  | $Al_2O_3$ wt % | Group 2 Oxides wt % | $SiO_2$ wt % |
| --- | --- | --- | --- |
| Inventive Example 1 | 98.85 | 0.46 | 0.60 |
| Comparative Example 1 | 95.38 | 1.89 | 2.43 |

Figure 2A:
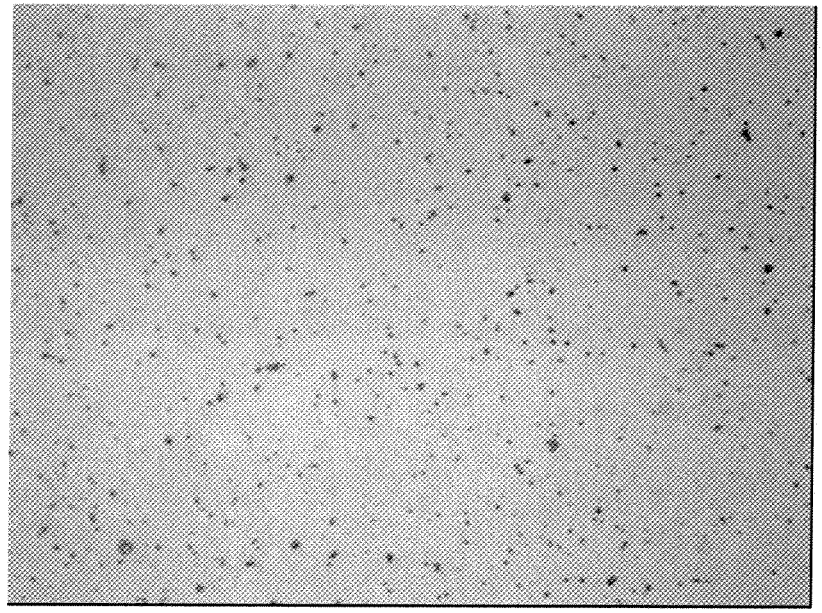
FIG. 2A is a photomicrograph of one embodiment of the inventive ceramic material (08-B-10) at 200× magnification.
Figure 2B:
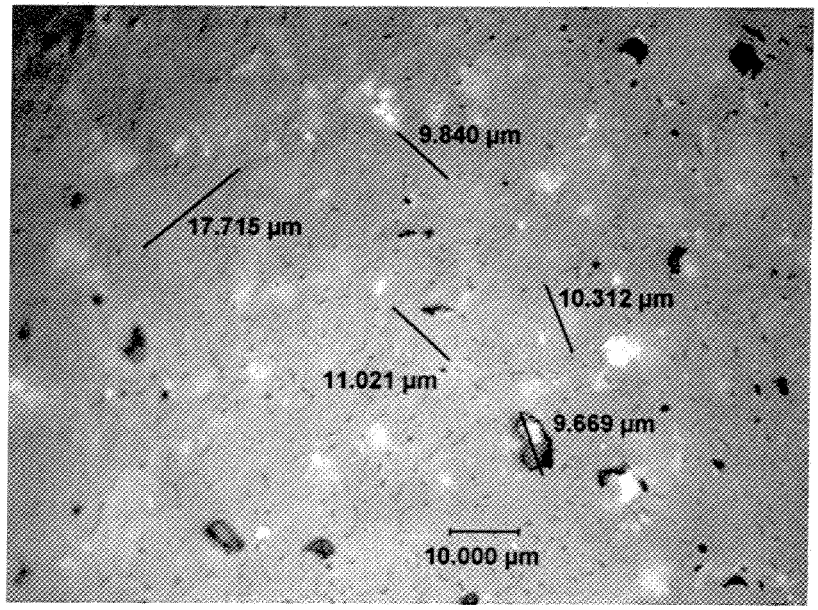
FIG. 2B is a photomicrograph of one embodiment of the inventive ceramic material (08-B-10) at 1000× magnification.
Figure 3A:
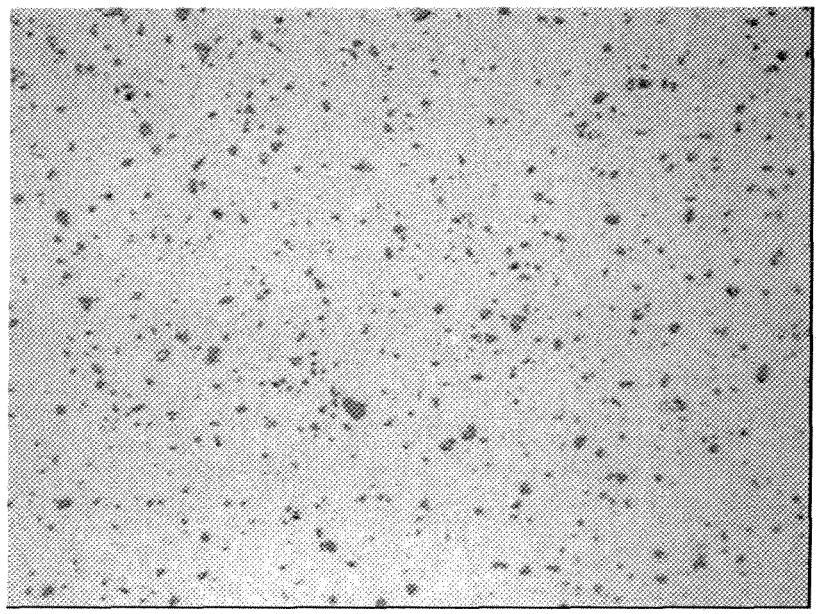
FIG. 3A is a photomicrograph of a prior art ceramic material (09-B-23) at 200× magnification.
Figure 3B:
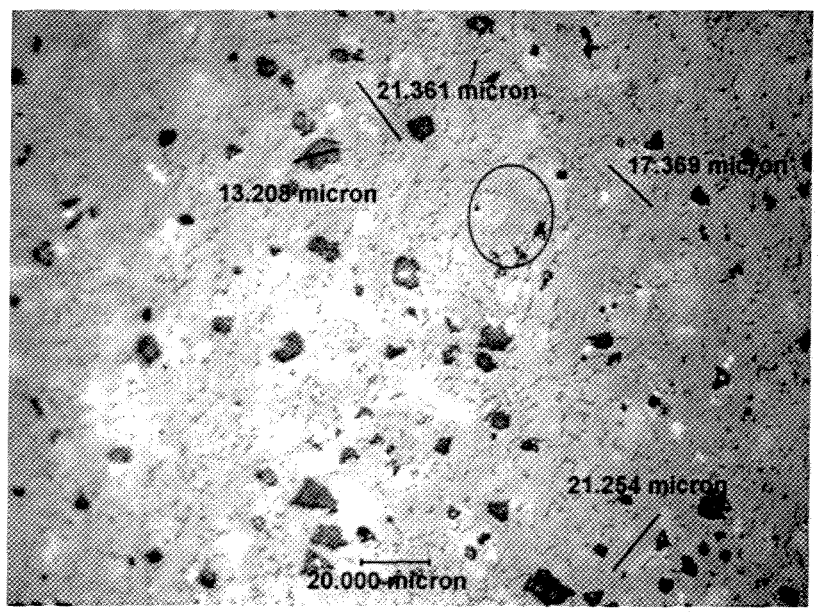
FIG. 3B is a photomicrograph of a prior art ceramic material (09-B-23) at 500× magnification.

Table 2 includes Inventive Examples 2 and 3, which are two more particular embodiments of the many embodiments of the inventive ceramic material. FIG. 2 (top) a photomicrograph of Inventive Example 1 (08-B-10) at 200× magnification. FIG. 2 (bottom) is a photomicrograph of Inventive Example 1 (08-B-10) at 1000× magnification. Table 2 also includes Comparative Example 2, which is another prior art ceramic material. FIG. 3 (top) is a photomicrograph of the prior art, Comparative Example 2 (09-B-23) at 200× magnification. FIG. 3 (bottom) is a photomicrograph of the prior art, Comparative Example 2 (09-B-23) at 500× magnification. After sintering, the ceramic material of Inventive Example 2 includes a glass phase in an amount of about 1.0 wt % and the ceramic material of Comparative Example 2 includes a glass phase in an amount of about 4.0 wt %.

TABLE 2

| | $Al_2O_3$ wt % | Group 2 Oxides wt % | | | Group 4 Oxides wt % | | Group 1 Oxides wt % | | |
|---|---|---|---|---|---|---|---|---|---|
| | | CaO wt % | MgO wt % | $SiO_2$ wt % | $TiO_2$ wt % | $ZrO_2$ wt % | $K_2O$ wt % | $Na_2O$ wt % | $P_2O_5$ wt % |
| Inventive Example 2 (ID No. 08-B-10) | 98.85 | 0.39 | 0.073 | 0.60 | 0.004 | 0.08 | 0.003 | 0.0007 | 0.0027 |
| Inventive Example 3 (ID Nos. 09-B-41) | 98.80 | 0.46 | 0.037 | 0.62 | 0.005 | 0.08 | 0.004 | 0.0008 | 0.0031 |
| Comparative Example 2 (ID No. 09-B-23) | 95.38 | 1.55 | 0.29 | 2.43 | 0.015 | 0.30 | 0.014 | 0.0027 | 0.0105 |

Inventive Example 2 (08-B-10) may include the following commercially available products, in wt % of the ceramic material, Almatis A152-SG Alumina in an amount of 98.19 wt %; Edgar Plastic Kaolin (EPK) in an amount of 0.84 wt %; Yellowstone Talc in an amount of 0.22 wt %; Hubercarb $CaCO_3$ in an amount of 0.68 wt %; and CC10 Zirconia in an amount of 0.08 wt %.

Further, the present invention includes the method of fabricating the ceramic material for an insulator 22 of a spark plug 20. As alluded to above, the method includes providing the $Al_2O_3$ in the form of ceramic particles having a median particle size of 1.2 μm to 1.8 μm. In one embodiment, the method includes providing the other components of the ceramic material, including the CaO, MgO, $SiO_2$, $TiO_2$ $ZrO_2$, $K_2O$, $Na_2O$, and $P_2O_5$, in the form of ceramic particles. As alluded to above, the method includes providing the $Al_2O_3$ in an amount of 98.00 wt % to 99.50 wt %, and providing the at least one Group 2 oxide in an amount of 0.16 wt % to 0.70 wt %; and providing the $SiO_2$ in an amount of 0.25 wt % to 0.75 wt %.

One embodiment of the method includes milling a suspension of the ceramic particles dispersed in water for about six hours. The embodiment includes adding a deflocculating agent such as Darvan 821A and a binder to the suspension. The embodiment next includes spray drying the ceramic particles using a spray drier, such as a Bowen #1 spray dryer operating at an outlet temperature of about 125° C. Next, the embodiment includes screening the spray dried ceramic particles to a size of about –60 mesh. The embodiment includes forming the ceramic particles to a predetermined shape, for example pressing the ceramic particles to a pressure of about 30,000 psi and the predetermined shape. However, the ceramic particles may be pressed to other pressures. As alluded to above, in one embodiment, the ceramic particles are pressed to a generally cylindrical shape to form the insulator 22 shown in FIG. 1. In one embodiment, the outer surface of the insulator 22 is shaped the a final shape using a grinding wheel. Next, the embodiment includes sintering or firing the pressed ceramic material to a temperature of about 1600° C. with about a dwell time of about three hours.

The sintered ceramic material of the present invention provides improved properties and performance for use as a spark plug insulator 22, compared to prior art ceramic insulators. The sintered ceramic material of the present invention includes a plurality of pores, also referred to as void spaces. Each pore of the ceramic material has a maximum pore size of less than 15.0 μm and median pore size of about 3.0 μm. The pore size is measured by the equivalent spherical diameter (ESD) of a single pore. The sintered ceramic material has a porosity, in area percent (area %) of the ceramic material, up to 1.50 area %. The total area of the ceramic material includes both the area of the solid components and area of the pores. The porosity is equal to the sum of the areas of each pore of the ceramic material. In other words, the porosity is obtained by determining the area of each pore of the ceramic material, and then adding the areas. The pore sizes and porosity are determined after sintering the ceramic material.

The porosity and pore sizes of the ceramic material are determined using a reflected light microscope, such as a Nikon ME600 DP with differential interference contrast (DIC) to view a sample of the ceramic material. The microscope includes a ruler or another measuring tool to measure the EDS and area of each visible pore. FIG. 2 (top) shows the microstructure and pores of Inventive Example 1 (08-B-10) at 200× magnification. FIG. 2 (bottom) shows the microstructure and pores of the of the Inventive Example 1 (08-B-10) at 1000×. FIG. 2 also identifies pores and grains and their corresponding sizes. FIG. 3 (top) shows the microstructure and pores of the prior art ceramic material, Comparative Example 2 (09-B-23) at 200× magnification. FIG. 3 (bottom) shows the microstructure and pores of the Comparative Example 2 (09-B-23) at 500×. FIG. 3 also identifies pores and grains and their corresponding size.

Testing was conducted to compare the median pore size, maximum pore size, total pore area, and porosity of one embodiment of the inventive ceramic material (08-B-10) to the prior art ceramic material (09-B-23). Specimens of each material were processed by conventional milling, spray drying, pressing into disks at 10,000 psi, and firing at about 1580° C. in a lab kiln. The sintered specimens were prepared for analysis by cutting a centerline section of each specimen with a diamond wafering saw. The resulting section was mounted using a quick-setting epoxy resin. The mounted samples were polished using an automatic polishing system. Final polishing and mechanical etching was accomplished using a high pH aqueous 0.06 μm colloidal silica slurry. Four images per specimen were obtained at the 200× magnification and analyzed using ImagePro Ver. 5 image analysis and processing software. Table 3 reports the median pore size, maximum pore size, total pore area, and porosity (area %), of the two specimens. The total pore area, in microns squared ($\mu m^2$), includes the sum of the pore areas of the four specimens. The pore sizes and porosity are the average of the four specimens. Table 4 reports, in the size measured in ESD of the ten largest pores observed in all four images for each specimen. As shown in Tables 3 and 4, the Inventive Example 1 (08-B-10) has a lower pore size, total pore area, and porosity than the prior art, Comparative Example 2 (09-B-23).

TABLE 3

Pore Size, Pore Area, and Porosity Data

| | Median Pore Size (ESD, μm) | Max. Pore Size (ESD, μm) | Total Pore Area (4 images, μm²) | Porosity (Area %) |
|---|---|---|---|---|
| Inventive Example 2 (ID No. 08-B-10) | 3.1 | 14.7 | 17,358 | 1.70 |
| Comparative Example 2 (ID Nos. 09-B-23) | 4.8 | 25.8 | 44,692 | 4.38 |

TABLE 4

Ten Largest Pores Data (ESD, μm)

| ID | 1 | 2 | 3 | 4 | 5 | 6 | 7 | 8 | 9 | 10 |
|---|---|---|---|---|---|---|---|---|---|---|
| Inventive Example 2 (ID No. 08-B-10) | 14.7 | 13.4 | 12.2 | 11.9 | 11.7 | 11.6 | 11.5 | 11.4 | 11.3 | 11.2 |
| Comparative Example 2 (ID Nos. 09-B-23) | 25.8 | 24.4 | 23.2 | 21.4 | 21.1 | 20.0 | 19.9 | 19.6 | 19.1 | 18.6 |

Testing was also conducted to measure the median pore size, maximum pore size, porosity, and average grain size of one embodiment of the inventive ceramic material (09-B-29) over a range of firing temperatures. Specimens were processed by conventional milling, spray drying, pressing into disks at 10,000 psi, and firing at a series of temperatures from 1500° C. to 1650° C. in a lab kiln. The sintered specimens were prepared for analysis by cutting a centerline section of each specimen with a diamond wafering saw. The resulting sections were mounted using a quick-setting epoxy resin. The mounted samples were polished using an automatic polishing system. Samples were initially ground using bonded diamond discs and polished using 9 μm and 3 μm diamond slurries. Final polishing and mechanical etching was accomplished using a aqueous 0.05 μm colloidal alumina slurry. Pore size observations were made using a reflected light microscope at magnifications up to 1000× and images were captured using an attached camera system. Four images per specimen were obtained at the 200× magnification and analyzed using ImagePro Ver. 5 image analysis and processing software. Grain size analysis was performed on thermally etched sections of the specimens using SEM as per ASTM E-112-96. Table 5 reports the median pore size and porosity of the specimens over a range of firing temperatures from 1500° C. to 1650° C. Table 6 reports average grain size of the specimens over a range of temperatures from 1520° C. to 1650° C.

TABLE 5

Pore Size and Porosity Data

| Specimen Firing Temperature (° C.) | Median Pore Size (ESD, μm) | Max. Pore Size (ESD, μm) | Porosity (Area %) |
|---|---|---|---|
| 1500 | 3.1 | 27.8 | 4.7 |
| 1520 | 2.9 | 20.6 | 3.0 |
| 1550 | 3.0 | 18.3 | 2.0 |
| 1570 | 3.2 | 18.6 | 2.3 |
| 1580 | 3.1 | 18.9 | 5.1 |
| 1590 | 3.3 | 22.9 | 2.1 |
| 1600 | 3.3 | 18.3 | 2.0 |
| 1610 | 3.6 | 17.6 | 2.5 |
| 1620 | 3.5 | 26.4 | 2.3 |
| 1650 | 4.2 | 30.0 | 5.0 |

TABLE 6

Mean Grain Size

| Specimen Firing Temperature (° C.) | Mean Grain Size (μm) |
|---|---|
| 1520 | 1.4 |
| 1550 | 1.7 |
| 1580 | 2.5 |
| 1600 | 2.7 |
| 1650 | 6.0 |

The inventive ceramic material has a higher green density, green strength, fired bulk density, and fired relative density than prior art ceramic materials. Green density is equal to the bulk density of the ceramic material after pressing and before sintering. The bulk density is equal to the mass of the ceramic particles of the ceramic material divided by the total volume of the ceramic material. As stated above, the total volume of the ceramic material includes both the volume of the solid components and the volume of the pores. Accordingly, the green density is measured after pressing and before sintering. Green strength is the mechanical strength required to withstand mechanical operations to which the ceramic material is subjected after pressing and before sintering, without damaging its fine details and sharp edges. Accordingly, green strength is measured after pressing but before sintering the ceramic material. The fired bulk density and fired relative density are measured after sintering the ceramic material. The fired bulk density is equal to the mass of the sintered ceramic material divided by the total volume of the sintered ceramic material. The fired relative density is the ratio of the fired bulk density of the ceramic material to the theoretical density of the material.

Testing was conducted to compare the green density, green strength, fired bulk density, and fired relative density of one embodiment of the inventive ceramic material (08-B-10) to a prior art ceramic material (09-B-23). Specimens of each material were processed by conventional milling, spray drying, pressing into disks at 9,500 psi, and firing at about 1560° C., 1580° C., and 1600° C. The green density was tested after pressing and before sintering. Table 7 reports the green density, green strength, fired bulk density, and fired relative density of the specimens. As shown in Table 7, the inventive ceramic material (08-B-10) has a higher green density, green strength, fired bulk density, and fired relative density than the prior art ceramic material (09-B-23).

strength and performance, compared to the prior art ceramic material. The inventive ceramic material (REG-G) had an average voltage at failure of 46.4 kV, which was about 5.7% higher than the prior art ceramic material (REG-F), which had average voltage at failure of 43.9 kV. More importantly, the minimum voltage at failure of the sample spark plugs including the inventive ceramic material (REG-G) was 41.0 kV, which was 5.1% higher than the minimum failure voltage of the sample spark plugs including the prior art ceramic material (REG-F), which was 39.0 kV.

TABLE 7

Green Density, Green Strength, Fired Bulk Density and Fired Relative Density Data

|  | Green Density | Green Strength | Fired Bulk Density (g/cm$^3$) | | | Fired Relative Density (g/cm$^3$) | | |
| --- | --- | --- | --- | --- | --- | --- | --- | --- |
|  |  |  | 1560° C. | 1580° C. | 1600° C. | 1560° C. | 1580° C. | 1600° C. |
| Inventive Example 2 (ID No. 08-B-10) | 2.336 | 46.8 | 3.884 | 3.882 | 3.860 | 0.979 | 0.978 | 0.973 |
| Comparative Example 2 (ID Nos. 09-B-23) | 2.302 | 44.4 | 3.766 | 3.766 | 3.756 | 0.958 | 0.958 | 0.955 |

The inventive ceramic material has a greater dielectric breakdown strength (DBS) than prior art ceramic materials. Dielectric breakdown strength is the maximum electric field strength the ceramic material can withstand without breaking down, i.e. without experiencing failure of its insulating properties.

Testing was conducted to compare the DBS of an inventive ceramic material (REG-G) to a prior art ceramic material (REG-F). The inventive ceramic material (REG-G) has the same composition as Inventive Example 2 (08-B-10) of Table 2 above. The prior art ceramic material (REG-F) has the same composition as Comparative Example 2 (09-B-23) of Table 2 above. Eleven insulator specimens were formed of the inventive ceramic material (REG-G) and twelve insulator specimens were formed of the prior art ceramic material (REG-F) by conventional milling, spray drying, pressing into cylindrical blanks at 9,500 psi, cutting the desired profile into the unfired blanks using a grinding wheel, and firing the blanks at about 1600° C. Each of the insulator specimens were placed in a sample spark plug having a 10.0 millimeter thread design. The spark plugs were tested by threading them into a test fixture and pressurized around the firing end to prevent a spark from forming between the center electrode and ground electrode, thus forcing dielectric puncture through the ceramic insulator specimens. A voltage provided by an automotive ignition source was applied to the spark plugs and increased in steps at a rate of 1 kV per second until failure occurred. After testing, the metallic shells of the sample spark plugs were removed to verify that dielectric puncture had occurred in the insulator specimens.

The dielectric testing results are shown in Table 8, indicating the inventive ceramic material has an improved dielectric

TABLE 8

Dielectric Strength

|  | No. of Samples | Average Voltage at Failure (kV) | Minimum Voltage at Failure (kV) |
| --- | --- | --- | --- |
| Inventive Example 4 (ID No. REG-G) | 11 | 46.4 | 41.0 |
| Comparative Example 3 (ID Nos. REG-F) | 12 | 43.9 | 39.0 |

The test results also indicate the lower pore size, lower pore area, and higher densities reduce the weak spots of the ceramic material and the amount of trapped gas that can become ionized in the ceramic material. Thus, the inventive ceramic material has a higher DBS and a reduced likelihood of dielectric failure compared to prior art ceramic materials.

Testing was also conducted to determine the correlation of pore size and pore area with dielectric breakdown strength and correlation of one embodiment of the inventive material (09-B-29) over a range of firing temperatures. As stated above, the dielectric breakdown strength is the maximum electric field strength the ceramic material can withstand intrinsically without breaking down. The specimens used for this testing were disks with thickness of about 3.5 mm, while the dielectric testing previously described was performed on insulators with wall thickness of 2.0 mm. The dielectric breakdown strength was measured according to ASTM D-149. Pore size and pore area were measured according to ASTM E-112.

Testing was also conducted to determine correlation between grain size and dielectric breakdown strength of one embodiment of the inventive material (09-B-29) over a range of firing temperatures. The specimens used for this testing were disks with thickness of about 3.5 mm, while the dielectric testing previously described was performed on insulators with wall thickness of 2.0 mm. The dielectric breakdown strength was measured according to ASTM D-149 and particle size was measured according to ASTM E-112.

The ceramic material provides a higher thermal conductivity compared to prior art ceramic materials used for spark plug insulators. One embodiment of the inventive ceramic material (08-B-10) has a thermal conductivity at room temperature of about 35 W/mK, whereas prior art ceramic materials typically have a thermal conductivity at room temperature of about 24 W/mK. The thermal conductivity is measured after sintering the ceramic material and can be measured by the laser flash method (ASTM E 1461).

Obviously, many modifications and variations of the present invention are possible in light of the above teachings and may be practiced otherwise than as specifically described while within the scope of the invention.

The invention claimed is:

1. A ceramic material for an insulator of a spark plug comprising, in weight percent (wt %) of said ceramic material,
   aluminum oxide ($Al_2O_3$) in an amount of 98.00 wt % to 99.50 wt %;
   at least one oxide of a Group 2 alkaline earth metal (Group 2 oxide) in an amount of 0.16 wt % to 0.70 wt %; said at least one Group 2 oxide including at least one of calcium oxide (CaO), magnesium oxide (MgO), beryllium oxide (BeO), strontium oxide (SrO), barium oxide (BaO), and radium oxide (RaO);
   silicon dioxide ($SiO_2$) in an amount of 0.25 wt % to 0.75 wt %;
   at least one oxide of a Group 4 transitional metal (Group 4 oxide) in an amount of 0.01 wt % to 0.16 wt %, said at least one Group 4 oxide including at least one of zirconium oxide ($ZrO_2$), titanium dioxide ($TiO_2$), hafnium oxide ($HfO_2$), and rutherfordium oxide ($RfO_2$); and
   at least one oxide of a Group 1 alkali metal (Group 1 oxide) in an amount less than 0.0060 wt %; said at least one Group 1 oxide including at least one of potassium oxide ($K_2O$), sodium oxide ($Na_2O$), lithium oxide ($Li_2$), rubidium oxide ($Rb_2O$), cesium oxide ($Cs_2O$), and francium oxide ($Fr_2O$).

2. A ceramic material as set forth in claim 1 wherein said $Al_2O_3$ is formed of particles having a D50 median particle size by volume of 1.2 μm to 1.8 μm.

3. A ceramic material as set forth in claim 1 wherein said $Al_2O_3$ is formed of particles having a D90 particle size by volume of 2.5 μm to 6.0 μm.

4. A ceramic material as set forth in claim 1 wherein said $Al_2O_3$ is formed of particles having a specific surface area of 2.0 $m^2$/g to 5.0 $m^2$/g.

5. A ceramic material as set forth in claim 1 including MgO in an amount of 0.01 wt % to 0.15 wt %.

6. A ceramic material as set forth in claim 1 including CaO in an amount of 0.15 wt % to 0.55 wt %.

7. A ceramic material as set forth in claim 1 including $ZrO_2$ and $TiO_2$ in an amount of 0.07 wt % to 0.10 wt %.

8. A ceramic material as set forth in claim 1 including $ZrO_2$ in an amount of 0.01 wt % to 0.15 wt %.

9. A ceramic material as set forth in claim 1 including $TiO_2$ in an amount of up to 0.01 wt %.

10. A ceramic material as set forth in claim 1 including $K_2O$ and $Na_2O$ in an amount less than 0.0060 wt %.

11. A ceramic material as set forth in claim 1 including a glass phase in an amount of 0.50 wt % to 2.0 wt %.

12. A ceramic material as set forth in claim 11 wherein said glass phase includes at least a portion of said $Al_2O_3$, said Group 2 oxides, and said $SiO_2$.

13. A ceramic material as set forth in claim 12 wherein said glass phase includes, in weight percent of said glass phase, said $Al_2O_3$ in an amount of 5.0 wt % to 50.0 wt %, said $SiO_2$ in an amount of 27.0 wt % to 50.0 wt %, and wherein said Group 2 oxides include CaO in an amount 15.0 wt % to 24.0 wt % and MgO in an amount of 0.5 wt % to 7.7 wt %.

14. A ceramic material as set forth in claim 1 including secondary crystals comprising at least a portion of said $Al_2O_3$, said Group 2 oxides, and said $SiO_2$.

15. A ceramic material as set forth in claim 14 wherein said secondary crystals include at least one of calcium hexa-aluminate ($CaAl_{12}O_{19}$) spinel ($MgAl_2O_4$), anorthite ($CaAl_2Si_2O_8$), and mullite ($Al_6Si_2O_{13}$).

16. A ceramic material as set forth in claim 1 including said $Al_2O_3$ in an amount of 98.85 wt %, said Group 2 oxides in an amount of 0.46 wt %, and said $SiO_2$ in an amount of 0.60 wt %.

17. A ceramic material as set forth in claim 1 wherein said Group 2 oxides include CaO and MgO and including said $Al_2O_3$ in an amount of 98.85 wt %, said CaO in an amount of 0.39 wt %, said MgO in an amount of 0.073 wt %, said $SiO_2$ in an amount of 0.60 wt %, $TiO_2$ in an amount of 0.004 wt %, $ZrO_2$ in an amount of 0.08 wt %, $K_2O$ in an amount of 0.003 wt %, $Na_2O$ in an amount of 0.0007 wt %, and $P_2O_5$ in an amount of 0.0027 wt %.

18. A ceramic material as set forth in claim 1 wherein said Group 2 oxides include CaO and MgO and including said $Al_2O_3$ in an amount of 98.80 wt %, said CaO in an amount of 0.46 wt %, said MgO in an amount of 0.037 wt %, said $SiO_2$ in an amount of 0.62 wt %, $TiO_2$ in an amount of 0.005 wt %, $ZrO_2$ in an amount of 0.08 wt %, $K_2O$ in an amount of 0.004 wt %, $Na_2O$ in an amount of 0.0008 wt %, and $P_2O_5$ in an amount of 0.0031 wt %.

19. A insulator formed of a ceramic material for a spark plug comprising, in weight percent (wt %) of said ceramic material, aluminum oxide ($Al_2O_3$) in an amount of 98.00 wt % to 99.50 wt %; at least one oxide of a Group 2 alkaline earth metal (Group 2 oxide) in an amount of 0.16 wt % to 0.70 wt %; said at least one Group 2 oxide including at least one of calcium oxide (CaO), magnesium oxide (MgO), beryllium oxide (BeO), strontium oxide (SrO), barium oxide (BaO), and radium oxide (RaO);
   silicon dioxide ($SiO_2$) in an amount of 0.25 wt % to 0.75 wt %;
   at least one oxide of a Group 4 transition metal (Group 4 oxide) in an amount of 0.01wt % to 0.16 wt %, said at least one Group 4 oxide including at least one of zirconium oxide ($ZrO_2$), titanium dioxide ($TiO_2$), hafnium oxide ($HfO_2$), and rutherfordium oxide ($RfO_2$); and
   at least one oxide of a Group 1 alkali metal (Group 1 oxide) in an amount less than 0.0060 wt %; said at least one Group 1 oxide including at least one of potassium oxide ($K_2O$), sodium oxide ($Na_2O$), lithium oxide ($Li_2O$), rubidium oxide ($Rb_2O$), cesium oxide ($Cs_2O$), and francium oxide ($Fr_2O$).

20. A spark plug including an insulator formed of a ceramic material comprising, in weight percent (wt %) of said ceramic material, aluminum oxide ($Al_2O_3$) in an amount of 98.00 wt % to 99.50 wt %; at least one oxide of a Group 2 alkaline earth metal (Group 2 oxide) in an amount of 0.16 wt % to 0.70 wt %; said at least one Group 2 oxide including at least one of calcium oxide (CaO), magnesium oxide (MgO), beryllium oxide (BeO), strontium oxide (SrO), barium oxide (BaO), and radium oxide (RaO);
   silicon dioxide ($SiO_2$) in an amount of 0.25 wt % to 0.75 wt %;

at least one oxide of a Group 4 transition metal (Group 4 oxide) in an amount of 0.01 wt % to 0.16 wt %, said at least one Group 4 oxide including at least one of zirconium oxide ($ZrO_2$), titanium dioxide ($TiO_2$), hafnium oxide ($HfO_2$), and rutherfordium oxide ($RfO_2$); and at least one oxide of a Group 1 alkali metal (Group 1 oxide) in an amount less than 0.0060 wt %; said at least one Group 1 oxide including at least one of potassium oxide ($K_2O$), sodium oxide ($Na_2O$), lithium oxide ($Li_2O$), rubidium oxide ($Rb_2O$), cesium oxide ($Cs_2O$), and francium oxide ($Fr_2O$).

21. A method of fabricating a ceramic material for an insulator of a spark plug comprising the steps of:

providing ceramic particles including, in weight percent wt % of the ceramic material, aluminum oxide ($Al_2O_3$) having a median particle size of 1.2 μm to 1.8 μm in an amount of 98.00 wt % to 99.50 wt %, at least one oxide of a Group 2 alkali earth metal (Group 2 oxide) in an amount of 0.16 wt % to 0.60 wt %, the at least one Group 2 oxide including at least one of calcium oxide (CaO), magnesium oxide (MgO), beryllium oxide (BeO), strontium oxide (SrO), barium oxide (BaO), and radium oxide (RaO), silicon dioxide ($SiO_2$) in an amount of 0.25 wt % to 0.75 wt %, at least one oxide of a Group 4 transition metal (Group 4 oxide) in an amount of 0.01 wt % to 0.16 wt %, the at least one Group 4 oxide including at least one of zirconium oxide ($ZrO_2$), titanium dioxide ($TiO_2$), hafnium oxide ($HfO_2$), and rutherfordium oxide ($RfO_2$), at least one oxide of a Group 1 alkali metal (Group 1 oxide) in an amount less than 0.0060 wt %, and the at least one Group 1 oxide including at least one of potassium oxide ($K_2O$), sodium oxide ($Na_2O$), lithium oxide ($Li_3O$), rubidium oxide ($Rb_2$), cesium oxide ($Cs_2O$), and francium oxide ($Fr_2O$);

pressing the ceramic particles; and sintering the ceramic particles.

22. A method of fabricating an insulator formed of a ceramic material for a spark plug comprising the steps of:

providing ceramic particles including, in weight percent wt % of the ceramic material, aluminum oxide ($Al_2O_3$) having a median particle size of 1.2 μm to 1.8 μm in an amount of 98.00 wt % to 99.50 wt %, at least one oxide of a Group 2 alkali earth metal (Group 2 oxide) in an amount of 0.16 wt % to 0.60 wt %, the at least one Group 2 oxide including at least one of calcium oxide (CaO), magnesium oxide (MgO), beryllium oxide (BeO), strontium oxide (SrO), barium oxide (BaO), and radium oxide (RaO), silicon dioxide ($SiO_2$) in an amount of 0.25 wt % to 0.75 wt %, at least one oxide of a Group 4 transition metal (Group 4 oxide) in an amount of 0.01 wt % to 0.16 wt %, the at least one Group 4 oxide including at least one of zirconium oxide ($ZrO_2$), titanium dioxide ($TiO_2$), hafnium oxide ($HfO_2$), and rutherfordium oxide ($RfO_2$), at least one oxide of a Group 1 alkali metal (Group 1 oxide) in an amount less than 0.0060 wt % and the at least one Group 1 oxide including at least one of potassium oxide ($K_2O$), sodium oxide ($Na_2O$), lithium oxide ($Li_2O$), rubidium oxide ($Rb_2O$), cesium oxide ($Cs_2O$), and francium oxide ($Fr_2O$);

pressing the ceramic particles;

sintering the ceramic particles; and forming the ceramic particles to a predetermined shape.

* * * * *

UNITED STATES PATENT AND TRADEMARK OFFICE
CERTIFICATE OF CORRECTION

PATENT NO. : 8,614,542 B2  Page 1 of 1
APPLICATION NO. : 12/869259
DATED : December 24, 2013
INVENTOR(S) : Walker et al.

It is certified that error appears in the above-identified patent and that said Letters Patent is hereby corrected as shown below:

In the Specifications:

| Column: | Line: | |
|---|---|---|
| 1 | 38 | "about 1000 C., and" should read "about 1000 C, and" |
| 3 | 63 | "comprising Al303" should read "comprising Al203" |
| 9 | 57 | "1600 C. with" should read "1600 C with" |
| 10 | 48 | "1580 C. in" should read "1580 C in" |
| 10 | 63 | "Table 4 reports, in the size" should read "Table 4 reports, in um, the size" |

In the Claims:

| 15 | 31 | "transitional metal" should read "transition metal" |
|---|---|---|
| 15 | 39 | "lithium oxide (Li2)" should read "lithium oxide (Li20)" |
| 16 | 42 | "berryllium" should read "beryllium" |
| 18 | 1 | "lithium oxide (Li30)" should read "lithium oxide (Li20)" |
| 18 | 1 | "rubidium oxide (Rb2)" should read "rubidium oxide (Rb20)" |
| 18 | 24 | "0.0060 wt% and the" should read "0.0060 wt%, and the" |

Signed and Sealed this
First Day of April, 2014

Michelle K. Lee
*Deputy Director of the United States Patent and Trademark Office*